US008487578B2

(12) United States Patent
Kubota et al.

(10) Patent No.: US 8,487,578 B2
(45) Date of Patent: Jul. 16, 2013

(54) POSITION SENSING DEVICE AND METHOD FOR IMPLEMENTING FAILSAFE CONTROL ON POSITION SENSING SYSTEM INCLUDING THE SAME (75) Inventors: Takamitsu Kubota, Chiryu (JP); Akitoshi Mizutani, Okazaki (JP); Yoshiyuki Kono, Obu (JP)

(73) Assignee: Denso Corporation, Kariya (JP)

( * ) Notice: Subject to any disclaimer, the term of this patent is extended or adjusted under 35 U.S.C. 154(b) by 119 days.

(21) Appl. No.: 13/299,595

(22) Filed: Nov. 18, 2011

(65) Prior Publication Data
US 2012/0146568 A1 Jun. 14, 2012

(30) Foreign Application Priority Data

Dec. 10, 2010 (JP) ................................. 2010-275796

(51) Int. Cl.
*G05B 9/02* (2006.01)
*B43L 5/00* (2006.01)
(52) U.S. Cl.
USPC ............................................. 318/563; 33/1 R
(58) Field of Classification Search
USPC .................... 318/560, 561, 562, 563
See application file for complete search history.

(56) References Cited

U.S. PATENT DOCUMENTS

| 5,260,877 A | 11/1993 | Drobny et al. |
| 2001/0004213 A1 | 6/2001 | Kubota et al. |
| 2007/0285863 A1* | 12/2007 | Itoh ............................. 361/93.1 |
| 2011/0221415 A1* | 9/2011 | Otsuka et al. ................ 323/283 |

FOREIGN PATENT DOCUMENTS

JP 2009198459 9/2009

* cited by examiner

*Primary Examiner* — Lincoln Donovan
*Assistant Examiner* — Zoheb Imtiaz (57) ABSTRACT A movement detection unit detects a movement of a detected object and outputs a voltage signal to an electronic control unit. A buffer unit implements buffer amplification on the outputted voltage signal. A pull-up resistor element or a pull-down resistor element is connected with the buffer unit via a wiring portion. A current detection unit detects a direction of an electric current flowing through the wiring portion to output a safe specific voltage signal to the electronic control unit on disconnection of the wiring portion. A power-supply-voltage detection unit detects decrease in a power supply voltage applied to the movement detection unit. A voltage switching unit sets the voltage signal, which is outputted to the electronic control unit through the wiring portion, on a high-voltage side or a low-voltage side according to the detected direction of the electric current, on detection of decrease in the power supply voltage.

6 Claims, 7 Drawing Sheets

POSITION SENSING DEVICE AND METHOD FOR IMPLEMENTING FAILSAFE CONTROL ON POSITION SENSING SYSTEM INCLUDING THE SAME

CROSS REFERENCE TO RELATED APPLICATIONS

This application is based on and claims priority to Japanese Patent Application No. 2010-275796 filed on Dec. 10, 2010, the contents of which are incorporated in their entirely herein by reference.

FIELD OF THE INVENTION

The present invention relates to a position sensing device configured to detect a movement of a detected object such as a rotation angle and/or a stroke quantity of a detected object. The present invention further relates to a method for implementing a failsafe control on a position sensing system including the position sensing device.

BACKGROUND OF THE INVENTION

Conventionally, a known position sensing device is configured to detect a movement of a vehicular device. For example, such a known position sensing device is configured to detect a rotation angle of a throttle valve equipped in an electronically controlled throttle device for a vehicle, a rotation angle of an accelerator pedal equipped in an accelerator pedal module, a rotation angle of a tumble control valve, and/or a stroke quantity of a clutch actuator. For example, a position sensing device used for an electronically controlled throttle device is configured to output a voltage signal, which indicates an opening position of a throttle valve, to an electronic control unit (ECU). In this case, the ECU outputs a driving signal to a motor to drive the throttle valve according to the voltage signal such that the opening position of the throttle valve coincides with a target opening position suitable for an operation state of an internal combustion engine. Thus, the motor controls the opening position of the throttle valve at the target opening position in this way, thereby to control an amount of intake air supplied to the internal combustion engine.

In such an electronically controlled throttle device, a failsafe design is required to enable a safe control of the throttle valve when the position sensing device has a malfunction.

US Patent Application Publication US 2001/0004213 A1 (JP Patent 3491587) discloses a position sensing device including two hall IC devices for detecting a rotation angle of a throttle valve. The two hall IC devices have the same output characteristics in which the output voltage increases as the opening (opening position) of the throttle valve becomes large. In the present configuration of US 2001/0004213 A1, when one of the two hall IC devices has a malfunction, the other of the hall IC devices is capable of controlling the opening of the throttle valve.

To the contrary, U.S. Pat. No. 5,260,877 (JP Patent 3588127) discloses a position sensing device including two potentiometers having output characteristics different from each other for detecting a rotation angle of a throttle valve. In the present configuration of U.S. Pat. No. 5,260,877, an output voltage of one of the two potentiometers increases, as an opening of a throttle valve becomes large. In addition, an output voltage of the other of the two potentiometers decreases, as the opening of the throttle valve becomes large. In the configuration of U.S. Pat. No. 5,260,877, a circuit of the one potentiometer is connected with a pull-down resistor element, and a circuit of the other potentiometer is connected with a pull-up resistor element.

It is noted that when the electronic control throttle is equipped with, for example, two potentiometers having different output characteristics (different operations) when the power supply voltage decreases or two hall IC devices, there is a concern that the number of components increases to raise the manufacturing cost.

SUMMARY OF THE INVENTION

The present invention addresses the above disadvantage.

Further in consideration of the conventional arts, it is conceivable, in the configuration of US 2001/0004213 A1, to set a voltage signal, which is outputted from the hall IC device to the ECU, on a high-voltage side to increase the voltage signal, when a power supply voltage applied to the position sensing device decreases. In this case, the ECU outputs the driving signal to the motor to move the throttle valve in the closing direction, in response to the increase in voltage signal, thereby to manipulate the throttle valve at the target opening position. In this way, the ECU can control the vehicle on a safe side. In the configuration of U.S. Pat. No. 5,260,877, it is conceivable to set the voltage signal outputted from the one potentiometer to the ECU on the low-voltage side, and to set the voltage signal outputted from the other potentiometer to the ECU on the high-voltage side, when the power supply voltage applied to the position sensing device decreases. In this case, the two potentiometers have output characteristics different from each other in this way when the power supply voltage decreases. Thereby, the ECU outputs the driving signal to the motor to move the throttle valve in the closing direction, in response to the signals.

According to one aspect of the present invention, a position sensing device configured to output a voltage signal to an electronic control unit according to a movement of a detected object, the electronic control unit being configured to control the movement of the detected object, the position sensing device comprises a movement detection unit configured to output the voltage signal according to the movement of the detected object. The position sensing device further comprises a buffer unit configured to implement buffer amplification on the voltage signal of the movement detection unit. The position sensing device further comprises a current detection unit configured to detect a direction of an electric current, which flows through a wiring portion between a pull-up resistor element or a pull-down resistor element and the buffer unit, the pull-up resistor element or the pull-down resistor element being electrically connected to the wiring portion such that the electronic control unit receives a voltage signal, which enables control of the movement of the detected object, on a safe side, on disconnection of the wiring portion. The position sensing device further comprises a power-supply-voltage detection unit configured to detect decrease in a power supply voltage applied to the movement detection unit. The position sensing device further comprises a voltage switching unit configured to set the voltage signal, which is outputted to the electronic control unit through the wiring portion, on a high-voltage side or a low-voltage side according to the direction of the electric current detected by the current detection unit, when the power-supply-voltage detection unit detects decrease in the power supply voltage.

According to another aspect of the present invention, a method for implementing a failsafe control on a position sensing system, the position sensing system includes a position sensing device configured to detect a movement of the detected object and to output a voltage signal according to the detected movement. The position sensing system further includes an electronic control unit configured to receive the voltage signal and to control the movement of the detected object according to the received voltage signal. The position sensing system further includes a pull-up resistor element or a pull-down resistor element electrically connected to the position sensing device via a wiring portion and configured to output a safe voltage signal to the electronic control unit on disconnection of the wiring portion to enable the electronic control unit to control the movement of the detected object on a safe side. The method comprises detecting a direction of an electric current flowing through the wiring portion. The method further comprises detecting decrease in a power supply voltage applied to the position sensing device. The method further comprises setting the voltage signal on a high-voltage side or a low-voltage side according to the detected direction of the electric current, on detection of decrease in the power supply voltage.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF PREFERRED EMBODIMENTS

As follows, embodiments will be described with reference to drawings.

(First Embodiment)

Figure 1:
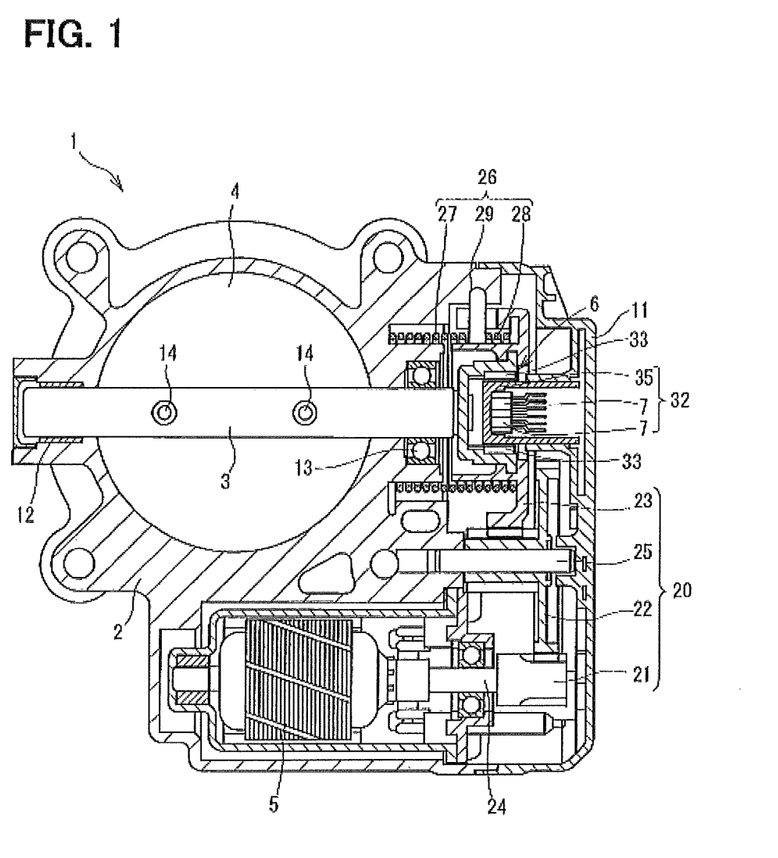
FIG. 1 is a sectional view showing an electronically controlled throttle device using a position sensing device according to one embodiment.
Figure 2:
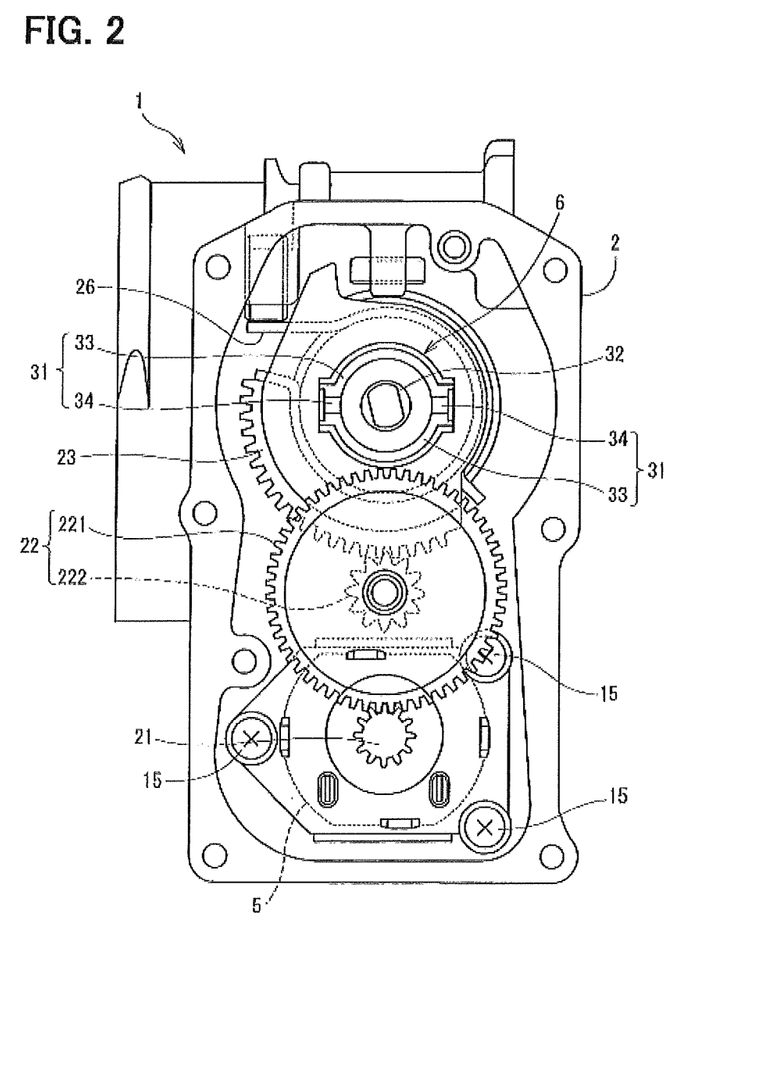
FIG. 2 is a view showing the electronically controlled throttle device, from which a gear cover was removed, when being viewed along the arrow II in FIG. 1.

FIGS. 1 to 8 show a position sensing device according to the first embodiment. The position sensing device according to the present embodiment is a rotation angle sensor used for an electronically controlled throttle 1 equipped in a vehicle. The electronically controlled throttle 1 is equipped on an intake pipe (not shown) of an internal combustion engine for controlling an amount of air drawn into a cylinder of the internal combustion engine. As shown in FIGS. 1, 2, the electronically controlled throttle 1 includes various components such as a throttle body 2, a throttle shaft 3, a throttle valve 4, an electric motor 5, and a rotation angle sensor 6. The throttle body 2 has an air passage being substantially in a tubular shape and communicated with a passage of the intake pipe. A gear cover 11 is mounted on an outer wall of the throttle body 2 with a fastener such as a screw. A space defined between the throttle body 2 and the gear cover 11 accommodates a mechanical reduction gear 20, a spring device 26, and the rotation angle sensor 6.

The throttle shaft 3 is in a column shape and supported by a dry bearing (bush) 12 and a roller bearing 13 equipped in the throttle body 2 such that the throttle shaft 3 is rotatable relative to the throttle body 2. The throttle valve 4 a butterfly-type rotary valve substantially being in a circular plate shape and configured to control an opening of an air passage formed in the throttle body 2. The throttle valve 4 is fixed to the throttle shaft 3 with a fastener 14 such as a screw or by caulking. In the present structure, the throttle valve 4 is rotatable integrally with the throttle shaft 3 to manipulate the opening of the air passage thereby to control an amount of air drawn into the cylinder of the internal combustion engine. The throttle valve 4 may be equivalent to a detected object.

The electric motor 5 is a direct-current motor configured to change the rotative direction when a flow direction of an electric current changes and to cause a rotation torque according to an amount of the electric current. The electric motor 5 is accommodated in an accommodation space formed in the throttle body 2 and is fixed to the throttle body 2 with a fastener 15 such as a screw. The electric motor 5 is controlled according to an instruction sent from an electronic control unit (ECU).

The mechanical reduction gear 20 reduces a rotation torque caused by the electric motor 5 and transmits the reduced rotation torque to the throttle valve 4. The mechanical reduction gear 20 includes a pinion gear 21, an intermediate gear 22, a gear rotor 23, and the like. The pinion gear 21 is fixed to an output shaft 24 of the electric motor 5 and rotatable integrally with the electric motor 5. The intermediate gear 22 is a double gear including a large-diameter gear 221 and a small-diameter gear 222 being coaxial with each other. The intermediate gear 22 is supported by the throttle body 2 and a support axis 25, which is supported by the gear cover 11, and is rotatable. The large-diameter gear 221 is meshed with the pinion gear 21, and the small-diameter gear 222 is meshed with the gear rotor 23. The gear rotor 23 is fixed to an end of the throttle shaft 3 and is rotatable integrally with the throttle shaft 3. The gear rotor 23 has gear teeth only in a region corresponding to a rotation range of the throttle valve 4.

The spring device 26 is configured to maintain the opening position of the throttle valve 4 at an intermediate position between a full close position and a full open position to enable an evacuation travel of the vehicle when electricity supply to the electric motor 5 is terminated. The spring device 26 includes a return spring 27, a default spring 28, and a joint portion 29. The return spring 27 applies a biasing force to the throttle valve 4 in a closing direction. The default spring 28 applies a biasing force to the throttle valve 4 in an opening direction. The return spring 27 and the default spring 28 are wound in opposite directions and integrally formed via the joint portion 29.

The rotation angle sensor 6 detects a rotation angle of the throttle valve 4 and outputs a voltage signal, which corresponds to the opening of the throttle valve 4, to the ECU. The rotation angle sensor 6 includes a magnetic path forming portion 31 and a magnetism detection portion 32. The magnetic path forming portion 31 is substantially in a cylindrical shape and is rotatable integrally with the throttle valve 4. The magnetism detection portion 32 is located in the magnetic path forming portion 31 and is not in contact with the magnetic path forming portion 31. The magnetic path forming portion 31 includes a pair of yokes 33 and a pair of magnets 34. The pair of yokes 33 is opposed to each other. Each of the pair of yokes 33 is formed of a magnetic material and is substantially in an arc shape. The pair of magnets 34 is located between both ends of the pair of yokes 33. The pair of magnets 34 causes an N-pole magnetic flux to one of the yokes 33 and causes an S-pole magnetic flux to the other of the yokes 33. The pair of yokes 33 and the pair of magnets 34 are combined together to be substantially in a cylindrical form. The pair of yokes 33 and the pair of magnets 34 are insert-molded inside the gear rotor 23.

The magnetism detection portion 32 is fixed to the gear cover 11. The magnetism detection portion 32 includes a stator core 35 and two hall IC devices 7. The stator core 35 is formed of a magnetic material and is substantially in a column shape. The stator core 35 has a magnetism detection gap in the diametral direction. The two hall IC devices 7 are located in the magnetism detection gap. The hall IC device 7 is an integrated circuit (IC) including a hall element and a signal amplification circuit, which are integrated with each other. The hall IC device 7 outputs a voltage signal to the ECU. The voltage signal outputted from the hall IC device 7 corresponds to a density of a magnetic flux passing through the hall IC device 7. The ECU implements a feedback control of the electric motor 5 such that the throttle position detected according to the voltage signal outputted from the hall IC device 7 coincides with a target opening position. The target opening position is set according to an operation state of the internal combustion engine.

Figure 3A:
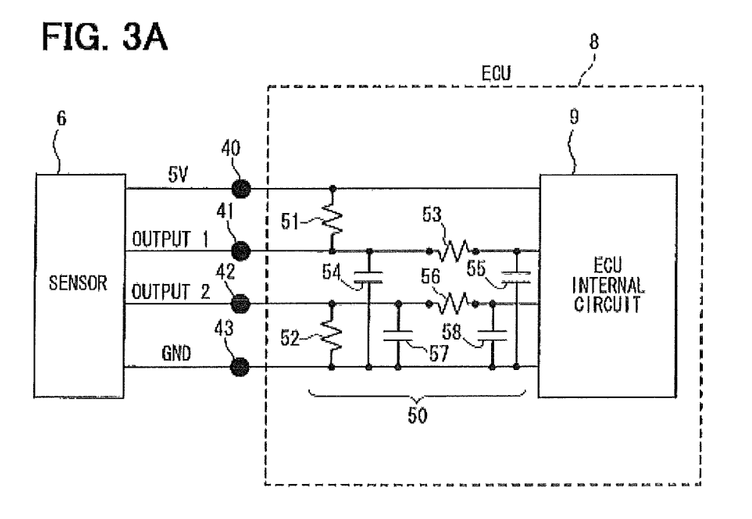
FIG. 3A is a circuit diagram showing the position sensing device connected with an ECU, according to the one embodiment.

FIG. 3A shows a circuit connecting the rotation angle sensor 6 with the ECU. The two hall IC devices 7 of the rotation angle sensor 6 are applied with a power supply voltage, such as 5 volt, from the ECU 8 through a power-supply terminal 40. A grounding terminal 43 of the two hall IC devices 7 is connected to the ECU 8. One of the hall IC devices 7 of the rotation angle sensor 6 outputs the voltage signal to the ECU 8 through a first output terminal 41. The other of the hall IC devices 7 of the rotation angle sensor 6 outputs the voltage signal to the ECU 8 through a second output terminal 42.

Figure 3B:
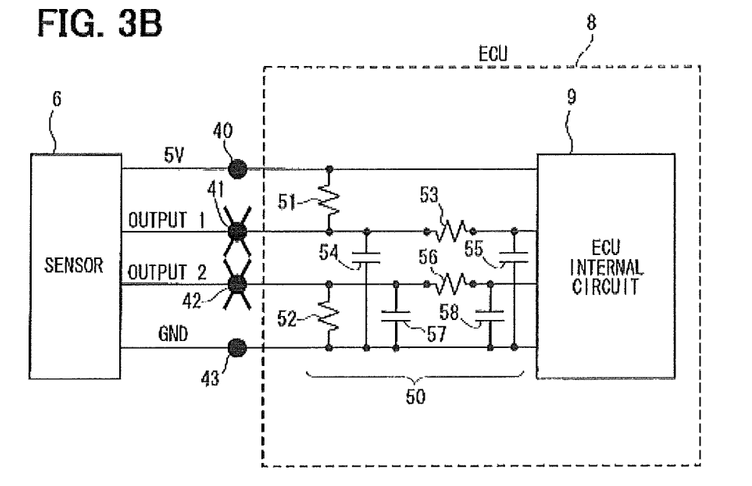
FIG. 3B is a circuit diagram showing the position sensing device disconnected from the ECU, according to the one embodiment.
Figure 4:
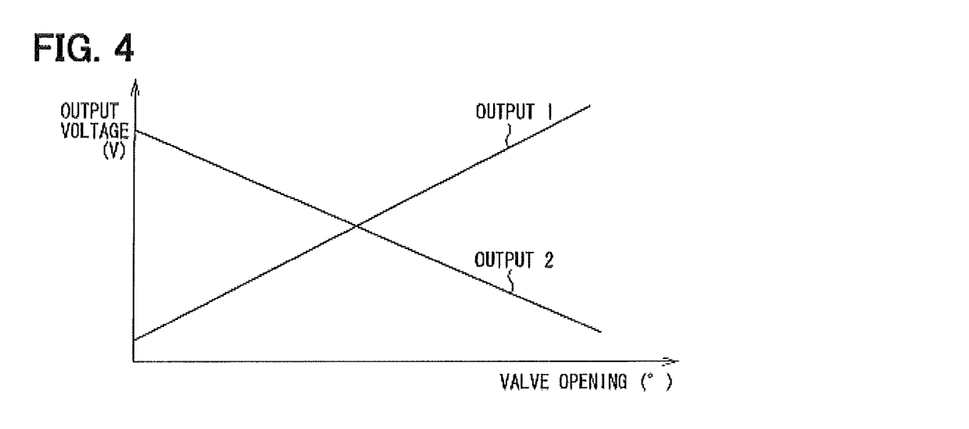
FIG. 4 is a graph showing an output characteristic of the position sensing device according to the one embodiment.

In FIGS. 3A, 3B, 4, the voltage signal outputted from the one hall IC device 7 is denoted by the output 1, and the voltage signal outputted from the other hall IC device 7 is denoted by the output 2.

As shown in FIG. 4, the one hall IC device 7 has an output characteristic such that the output voltage increases as the opening (valve opening) of the throttle valve 4 becomes large. The other hall IC device 7 has an output characteristic such that the output voltage decreases as the opening (valve opening) of the throttle valve 4 becomes large. In short, the voltage signals outputted from the two hall IC devices 7 of the rotation angle sensor 6 to the ECU 8 have cross characteristics.

Referring to FIG. 3A, a receptacle circuit 50 of the ECU 8 includes a pull-up resistor element 51, a pull-down resistor element 52, and a filter circuit correspondingly to the output characteristics of the hall IC devices 7. The pull-up resistor element 51 is connected to a wiring, which connects the power-supply terminal 40 with an ECU internal circuit 9, at one end. The pull-up resistor element 51 is further connected to a wiring, which connects the first output terminal 41 with the ECU internal circuit 9, at the other end. The pull-down resistor element 52 is connected to a wiring, which connects the grounding terminal 43 with the ECU internal circuit 9, at one end. The pull-down resistor element 52 is further connected to a wiring, which connects the second output terminal 42 with the ECU internal circuit 9, at the other end. A filter circuit, which includes a resistor element 53 and two capacitors 54, 55, is provided to a wiring, which connects the first output terminal 41 with the ECU internal circuit 9. Another filter circuit, which includes a resistor element 56 and two capacitors 57, 58, is provided to a wiring, which connects the second output terminal 42 with the ECU internal circuit 9. The filter circuits enhance a tolerance for noise of the rotation angle sensor 6 and the ECU internal circuit 9.

FIG. 3B shows a state where the first output terminal 41 and the second output terminal 42 are disconnected. In this case, the connecting point between a wiring, which extends from the first output terminal 41 to the ECU internal circuit 9, and the pull-up resistor element 51 is at 5 volt. Accordingly, the voltage signal inputted to the ECU internal circuit 9 is on a high-voltage side. Contrary, the connecting point between a wiring, which extends from the second output terminal 42 to the ECU internal circuit 9, and the pull-down resistor element 52 is at the same voltage as the GND. Accordingly, the voltage signal inputted to the ECU internal circuit 9 is on a low-voltage side.

Figure 5A:
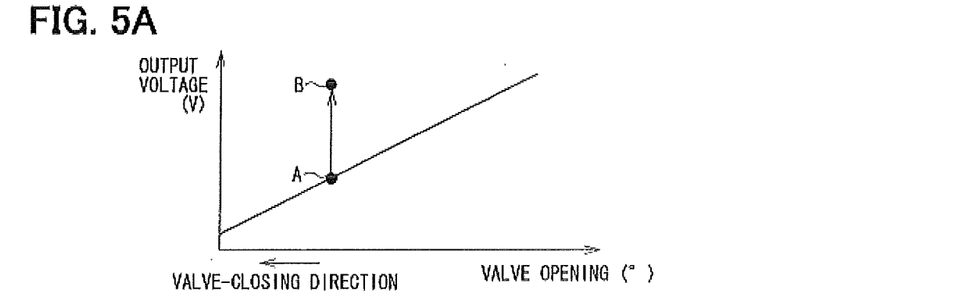
FIGS. 5A, 5B are graphs each showing an output characteristic of the position sensing device, when a power supply voltage decreases, according to the one embodiment.

FIG. 5A shows an upward output characteristic where the output voltage increases as the opening of the throttle valve 4 becomes large. In the upward output characteristic, when the voltage on the high-voltage side is inputted from the first output terminal 41 to the ECU internal circuit 9, the output voltage changes from a voltage A in a normal state to a voltage B in a malfunction state. In this case, the ECU 8 determines that the throttle valve 4 opens beyond the target opening position. Therefore, the ECU 8 outputs a driving signal to the electric motor 5 to manipulate the throttle valve 4 in the closing direction such that the opening position of the throttle valve 4 coincides with the target opening position.

Figure 5B:
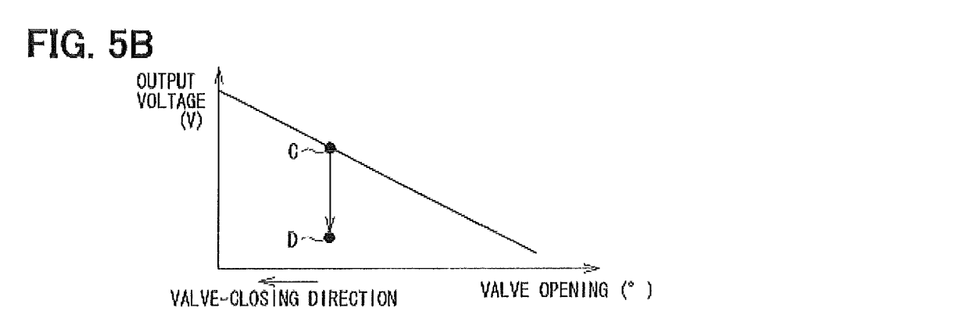

FIG. 5B shows a downward output characteristic where the output voltage decreases as the opening of the throttle valve 4 becomes large. In the downward output characteristic, when the voltage on the low-voltage side is inputted from the second output terminal 42 to the ECU internal circuit 9, the output voltage changes from a voltage C in a normal state to a voltage D in a malfunction state. In this case, the ECU 8 determines that the throttle valve 4 opens beyond the target opening position. Therefore, the ECU 8 outputs a driving signal to the electric motor 5 to manipulate the throttle valve 4 in the closing direction such that the opening position of the throttle valve 4 coincides with the target opening position. In this way, the ECU 8 can control the vehicle on a safe side.

Figure 6:
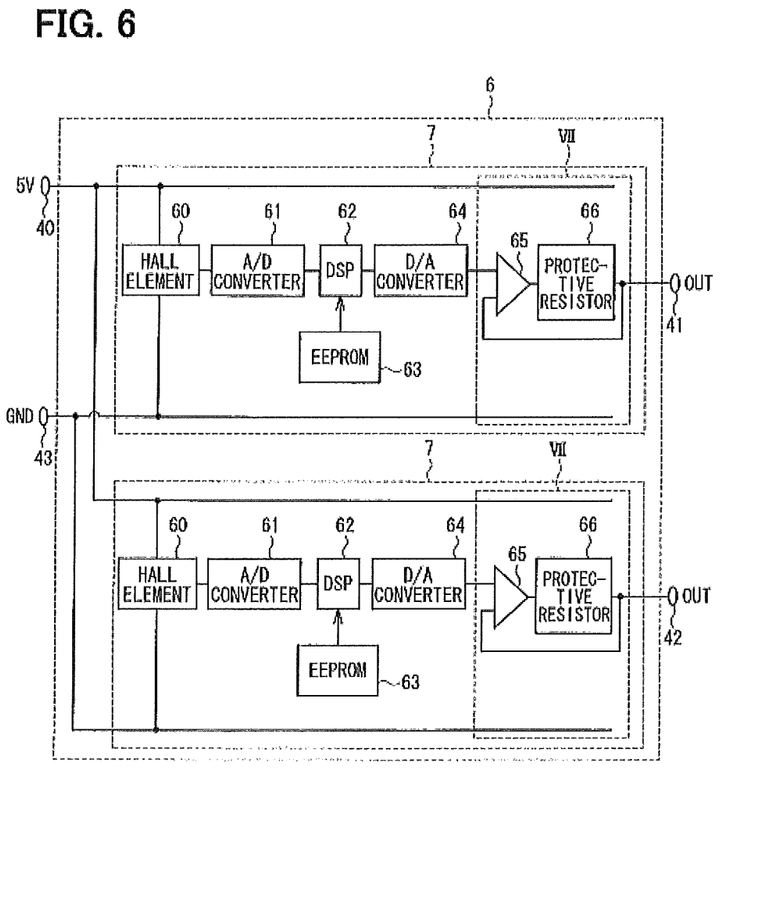
FIG. 6 is a circuit diagram showing a rotation angle sensor of the position sensing device according to the one embodiment of the present invention.

Subsequently, a circuit of the rotation angle sensor 6 will be described with reference to FIG. 6. The rotation angle sensor 6 includes the two hall IC devices 7. A hall element 60 outputs a voltage signal according to the density of magnetic flux passing through the hall element 60. An A/D converter 61 implements digital conversion on the voltage signal outputted from the hall element 60. A digital signal processor (DSP) 62 inputs the converted digital signal from the A/D converter 61. The DSP 62 implements an offset control, a gain control, and a clamp control according to a set value beforehand stored in an EEPROM 63. The offset control is implemented to set an offset of the output voltage relative to the opening of the throttle valve 4. The gain control is implemented to set an inclination of the output voltage relative to the opening of the throttle valve 4. The clamp control is implemented to set a maximum output voltage and a minimum output voltage. The signal processing enables the two hall IC devices 7 respectively to have output characteristics different from each other.

A D/A converter 64 implements analog conversion on the value, which is controlled by the DSP 62. A buffer amplifier 65 inputs the converted analog signal from the D/A converter

64. The buffer amplifier 65 includes a buffer circuit for implementing buffer amplification of the signal inputted to the buffer amplifier 65 to eliminate mutual influence with the circuit of the ECU 8. A protective resistor element 66 is provided between the buffer amplifier 65 and the output terminals 41, 42. The hall element 60 and the signal processing circuit, which includes the A/D converter 61, the DSP 62, the EEPROM 63, the D/A converter 64, and the like, may be equivalent to a movement detection unit. The buffer amplifier 65 may be equivalent to a buffer unit. The wiring, which connects the buffer amplifier 65 with the ECU internal circuit 9, may be equivalent to a wiring portion.

Figure 7:
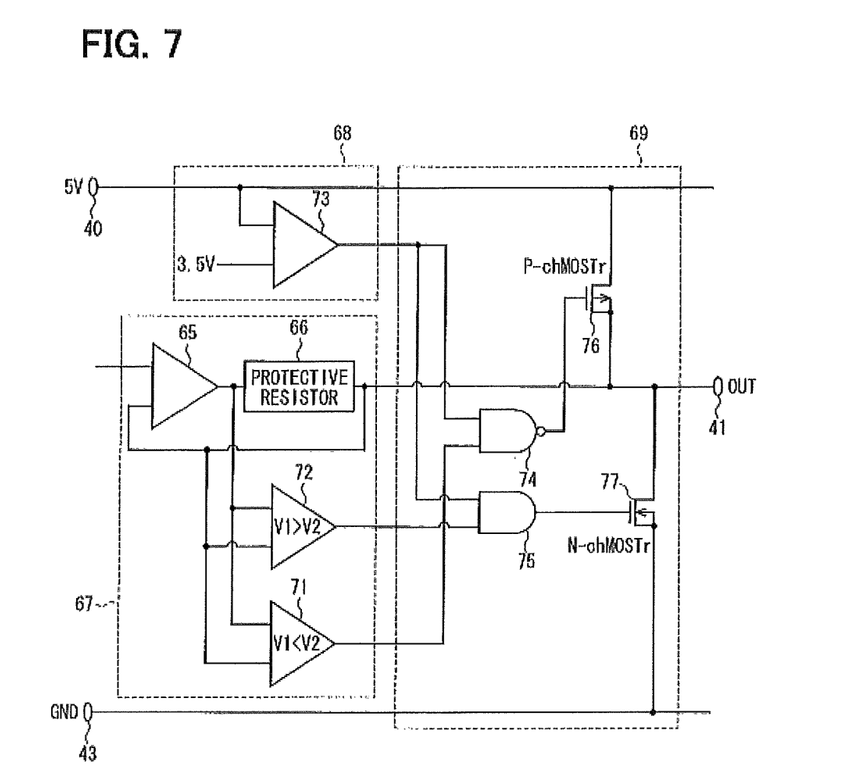
FIG. 7 is an enlarged circuit diagram showing a portion of the circuit denoted by VII in FIG. 6.

FIG. 7 shows a circuit provided between the buffer amplifier 65 and the first output terminal 41. FIG. 7 shows a circuit provided in the one hall IC device 7. A circuit provided in the other hall IC device 7 has the same configuration as that of the circuit provided in the one hall IC device 7. The buffer amplifier 65 and the output terminals 41 have a current detection circuit 67, a power-supply-voltage detection circuit 68, a voltage switching circuit 69, and the like therebetween. The current detection circuit 67 may be equivalent to a current detection unit. The power-supply-voltage detection circuit 68 may be equivalent to a power-supply-voltage detection unit. The voltage switching circuit 69 may be equivalent to a voltage switching unit.

The current detection circuit 67 includes the protective resistor element 66, a first comparator 71, a second comparator 72, and the like. The first comparator 71 and the second comparator 72 detect a voltage potential difference between both ends of the protective resistor element 66. The first comparator 71 outputs a signal of 1 when an electric potential V1 is less than an electric potential V2. The electric potential V1 is a voltage at a connecting point on the side of the buffer amplifier 65 relative to the protective resistor element 66. The electric potential V2 is a voltage at a connecting point on the side of the output terminal 41 relative to the protective resistor element 66. The second comparator 72 outputs a signal of 1 when the electric potential V1 is greater than the electric potential V2. The electric potential V1 is the voltage at the connecting point on the side of the buffer amplifier 65 relative to the protective resistor element 66. The electric potential V2 is the voltage at the connecting point on the side of the output terminal 41 relative to the protective resistor element 66.

In the case where the pull-up resistor element 51 is provided in the receptacle circuit 50 of the ECU 8 connected to the output terminal 41 of the one hail IC device 7, an electric current, which flows through the wiring connecting the pull-up resistor element 51 with the buffer amplifier 65, is drawn into the buffer amplifier 65. In this case, the first comparator 71 outputs a signal of 1, and the second comparator 72 outputs a signal of 0. Contrary, in the case where the pull-down resistor element 52 is provided in the receptacle circuit 50 of the ECU 8 connected to the output terminal 42 of the other hall IC device 7, an electric current, which flows through the wiring connecting the pull-down resistor element 52 with the buffer amplifier 65, is discharged from the buffer amplifier 65. In this case, the first comparator 71 outputs a signal of 0, and the second comparator 72 outputs a signal of 1.

The power-supply-voltage detection circuit 68 includes a third comparator 73 for detecting whether the power supply voltage decreases to be less than a predetermined voltage. The predetermined voltage related to the third comparator 73 may be set arbitrarily. In general, when the power supply voltage decreases, the voltage signal outputted from the hall IC device 7 decreases. According to the present embodiment, the predetermined voltage (allowable voltage) for the third comparator 73 is set at, for example, 3.5 volt in consideration of the decrease in voltage signal, which the ECU 8 of the electronically controlled throttle 1 allows. When the power supply voltage applied to the hall element 60 is higher than 3.5 volt, the third comparator 73 outputs a signal of 0. Contrary, when the power supply voltage applied to the hall element 60 decreases to be less than 3.5 volt, the third comparator 73 outputs a signal of 1.

The voltage switching circuit 69 includes an NAND circuit 74, an AND circuit 75, a P-channel type MOS transistor (p-MOS) 76 as a first switching element, an N-channel type MOS transistor (n-MOS) 77 as a second switching element, and the like. The NAND circuit 74 receives an output signal of the first comparator 71 and an output signal of the third comparator 73. The NAND circuit 74 outputs a signal of 0, when receiving a signal of 1 from the first comparator 71 and when receiving a signal of 1 from the third comparator 73. The p-MOS 76 receives the signal from the NAND circuit 74. The source of the p-MOS 76 is connected to the power supply wiring, and the drain of the p-MOS 76 is connected to the wiring, which connects the buffer amplifier 65 with the output terminal 41. When the gate of the p-MOS 76 receives a signal of 0 from the NAND circuit 74, the p-MOS 76 conducts the output terminal 41 with the power supply wiring. In this way, the output of the output terminal 41 is set on the high-voltage side.

The AND circuit 75 receives an output signal of the second comparator 72 and an output signal of the third comparator 73. The AND circuit 75 outputs a signal of 1, when receiving a signal of 1 from the second comparator 72 and when receiving a signal of 1 from the third comparator 73. The n-MOS 77 receives the signal from the AND circuit 75. The drain of the n-MOS 77 is connected to the GND wiring, and the source of the n-MOS 77 is connected to the wiring, which connects the buffer amplifier 65 with the output terminal 41. When the gate of the n-MOS 77 receives a signal of 1 from the AND circuit 75, the n-MOS 77 conducts the output terminal 41 with the GND. In this way, the output of the output terminal 41 is set on the low-voltage side.

Figure 8:
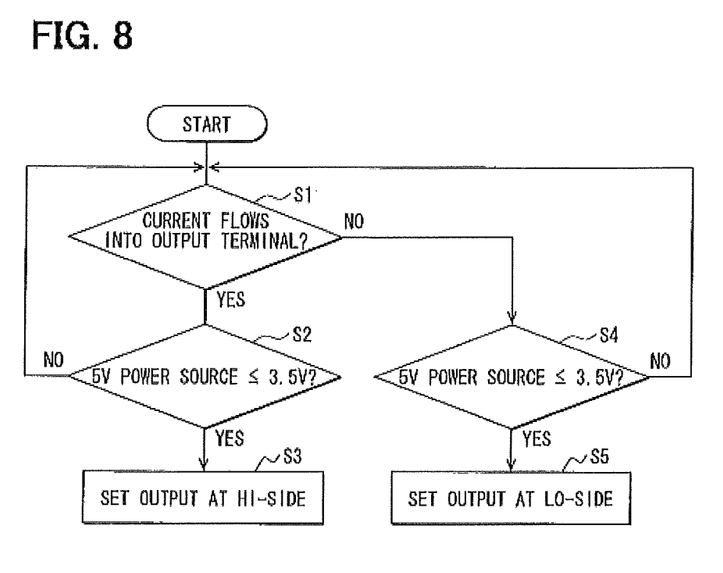
FIG. 8 is a flow chart showing an operation implemented when the power supply voltage of the position sensing device decreases, according to the one embodiment.

The operation of the circuit provided between the buffer amplifier 65 and the output terminal will be described with reference to the flow chart of FIG. 8.

At step S1, detection whether an electric current flows into the output terminals 41, 42 is implemented. In the case where an electric current flows into the output terminals 41, 42, the pull-up resistor element 51 is connected to the output terminals 41, 42. In this case, the operation proceeds to step S2. At step S2, detection whether the power supply voltage, which is normally 5 volt, is less than or equal to 3.5 volt is implemented. When the power supply voltage becomes less than or equal to 3.5V, the operation proceeds to step S3, at which the voltage outputted from the rotation angle sensor 6 to the ECU 8 is set on the high-voltage side.

Alternatively, at step S1, when an electric current is discharged from the output terminals 41, 42, the pull-down resistor element 52 is connected to the output terminals 41, 42. In this case, the operation proceeds to step S4. At step S2, detection whether the power supply voltage, which is normally 5 volt, is less than or equal to 3.5 volt is implemented. When the power supply voltage becomes less than or equal to 3.5V, the operation proceeds to step S5, at which the voltage outputted from the rotation angle sensor 6 to the ECU 8 is set on the low-voltage side.

According to the present embodiment, it is detected whether an electric current flows into the output terminals 41, 42 or an electric current is discharged from the output terminals 41, 42. Thereby, it is determined which the pull-up resistor element 51 or the pull-down resistor element 52 is connected to the receptacle circuit 50 of the ECU 8 connected with the output terminals 41, 42. In the present configuration, when the power supply voltage applied to the rotation angle sensor 6 decreases and when the pull-up resistor element 51 is connected to the receptacle circuit 50 of the ECU 8, the voltage signal outputted from the output terminals 41, 42 is set on the high-voltage side. Alternatively, when the pull-down resistor element 52 is connected to the receptacle circuit 50 of the ECU 8, the voltage signal outputted from the output terminals 41, 42 is set on the low-voltage side. In response to the voltage signal, the ECU 8 is capable of controlling the opening position of the throttle valve 4 in the closing direction. Therefore, in the case where the pull-up resistor element 51 or the pull-down resistor element 52 is connected to the receptacle circuit 50 of the ECU 8 in the rotation angle sensor 6 including multiple hall IC devices 7, common operation configuration of the rotation angle sensor 6 when the power supply voltage decreases can be utilized.

According to the present embodiment, in the case where the pull-up resistor element 51 is provided in the receptacle circuit 50 of the ECU 8, the voltage switching circuit 69 conducts the output terminal 41 with the power supply wiring when power supply voltage decreases. Alternatively, in the case where the pull-down resistor element 52 is provided in the receptacle circuit 50 of the ECU 8, the voltage switching circuit 69 conducts the output terminal with the grand wiring (GND). In the present configuration, common operation configuration of the rotation angle sensor 6 when the power supply voltage decreases can be utilized with a simple structure.

(Other Embodiment)

In the one embodiment described above, the position sensing device is applied to the rotation angle sensor 6 used for the electronically controlled throttle 1 equipped in a vehicle. Alternatively, the position sensing device may be applied to various devices such as a device for detecting a rotation angle of an accelerator pedal equipped in an accelerator pedal module, a device for detecting a rotation angle of a tumble control valve, and/or a device for detecting a stroke quantity of a clutch actuator.

In the one embodiment described above, the position sensing device is a magnetism detection sensor for detecting a movement of a detected object according to a magnetism. Alternatively, the position sensing device may be configured to detect a movement of a detected object according to various kinds of physical quantities. For example, the position sensing device may be an inductive type sensor, a capacitance type sensor, a photo-sensor, and/or the like.

Summarizing the above embodiment, the position sensing device is configured to output the voltage signal according to the movement of the detected object through the wiring portion to the electronic control unit, which is configured to control the movement of the detected object. The position sensing device includes the movement detection unit, the buffer unit, the power-supply-voltage detection unit, and the voltage switching unit. The buffer unit is configured to implement buffer amplification on the voltage signal of the movement detection unit, which is configured to output the voltage signal according to the movement of the detected object. The pull-up resistor element or the pull-down resistor element is electrically connected to the wiring portion such that the electronic control unit receives the voltage signal, which enables control of the movement of the detected object on the safe side on disconnection of the wiring portion. The current detection unit is configured to detect the direction of the electric current, which flows through the wiring portion between the pull-up resistor element or the pull-down resistor element and the buffer unit. The power-supply-voltage detection unit is configured to detect decrease in the power supply voltage applied to the movement detection unit. The voltage switching unit is configured to set the voltage signal outputted to the electronic control unit through the wiring portion on the high-voltage side or the low-voltage side according to the direction of the electric current detected by the current detection unit when the power-supply-voltage detection unit detects decrease in the power supply voltage.

In the present configuration, it is detected which one of the pull-up resistor element and the pull-down resistor element is connected to the wiring portion according to the direction of the electric current detected by the current detection unit. The voltage switching unit outputs the voltage signal, which corresponds to the pull-up resistor element or pull-down resistor element connected to the wiring portion, to the electronic control unit when the power supply voltage decreases. In the present configuration, the electronic control unit is capable of controlling the vehicle on the safe side such that the vehicle is operated to be in a safer state. Therefore, a common operation configuration of the position sensing device, when the power supply voltage of the movement detection unit decreases, can be utilized according to the output characteristic of the signal outputted from the movement detection unit, even in either case where the pull-up resistor element or the pull-down resistor element is connected to the wiring portion.

The voltage switching unit may be configured to set the voltage signal outputted to the electronic control unit through the wiring portion on the high-voltage side when the current detection unit detects the direction of the electric current flowing into the buffer unit and when the power-supply-voltage detection unit detects decrease in the power supply voltage. The voltage switching unit may be further configured to set the voltage signal outputted to the electronic control unit through the wiring portion on the low-voltage side when the current detection unit detects the direction of the electric current discharged from the buffer unit and when the power-supply-voltage detection unit detects decrease in the power supply voltage. Specifically, when the pull-up resistor element is connected to the wiring portion, the electric current flows from the pull-up resistor element into the buffer unit. In this case, similarly to the operation of the pull-up resistor element, the electronic control unit can control the movement of the detected object on the safe side by setting the voltage signal outputted to the electronic control unit through the wiring portion on the high-voltage side. To the contrary, when the pull-down resistor element is connected to the wiring portion, the electric current is discharged from the buffer unit into the pull-down resistor element. In this case, similarly to the operation of the pull-down resistor element, the electronic control unit can control the movement of the detected object on the safe side by setting the voltage signal outputted to the electronic control unit through the wiring portion on the low-voltage side.

The power-supply-voltage detection unit may be configured to output a signal, which indicates decrease in the power supply voltage, to the voltage switching unit when the power supply voltage decreases to be less than the allowable voltage which the electronic control unit allows. In this way, the position sensing device can output the voltage signal to enable the electronic control unit to control the movement of the detected object to be in a safer state when the power supply voltage decreases beyond the range which the electronic control unit permits. The allowable voltage, to which the electronic control unit allows decrease in the power supply voltage, may be determined in consideration of the function of the detected object, the configuration of the electronic control unit, and/or the like.

The voltage switching unit may include the first switching element configured to conduct the wiring portion with the power supply wiring when the current detection unit detects the direction of the electric current flowing into the buffer unit and when the power-supply-voltage detection unit detects decrease in the power supply voltage. The voltage switching unit may include the second switching element configured to conduct the wiring portion with the ground wiring (GND) when the current detection unit detects the direction of the electric current discharged from the buffer unit and when the power-supply-voltage detection unit detects decrease in the power supply voltage. In the present structure, common operation configuration of the position sensing device when the power supply voltage applied to the movement detection unit decreases can be utilized with a simple structure.

The movement detection unit may include the first movement detection unit configured to cause the output voltage to increase as the movement of the detected object becomes large and the second movement detection unit configured to cause the output voltage to decrease as the movement of a detected object becomes large. In the present configuration, the pull-up resistor element is connected to one of the wiring portion connected to the first movement detection unit and the wiring portion connected to the second movement detection unit, and the pull-down resistor element is connected to the other of the wiring portion connected to the first movement detection unit and the wiring portion connected to the second movement detection unit, according to the output characteristic of the first movement detection unit and the output characteristic of the second movement detection unit. In the present configuration where the position sensing device includes multiple movement detection units having the output characteristics different from each other, operation configuration when the power supply voltage applied to the movement detection unit decreases can be utilized in common. The position sensing device may include two or more movement detection units.

The above structures of the embodiments can be combined as appropriate. The above processings are not limited to be executed by the control devices such as the ECU 8, the ECU internal circuit 9, the devices in the sensor 6. The control unit may have various structures including such devices shown in the examples or alternative circuit configurations. It should be appreciated that while the processes of the embodiments of the present invention have been described herein as including a specific sequence of steps, further alternative embodiments including various other sequences of these steps and/or additional steps not disclosed herein are intended to be within the steps of the present invention.

Various modifications and alternations may be diversely made to the above embodiments without departing from the spirit of the present invention.

What is claimed is:

1. A position sensing device configured to output a voltage signal to an electronic control unit according to a movement of a detected object, the electronic control unit being configured to control the movement of the detected object, the position sensing device comprising:
    a movement detection unit configured to output the voltage signal according to the movement of the detected object;
    a buffer unit configured to implement buffer amplification on the voltage signal of the movement detection unit;
    a current detection unit configured to detect a direction of an electric current, which flows through a wiring portion between a pull-up resistor element or a pull-down resistor element and the buffer unit, the pull-up resistor element or the pull-down resistor element being electrically connected to the wiring portion such that the electronic control unit receives a voltage signal, which enables control of the movement of the detected object, on a safe side, on disconnection of the wiring portion;
    a power-supply-voltage detection unit configured to detect decrease in a power supply voltage applied to the movement detection unit; and
    a voltage switching unit configured to set the voltage signal, which is outputted to the electronic control unit through the wiring portion, on a high-voltage side or a low-voltage side according to the direction of the electric current detected by the current detection unit, when the power-supply-voltage detection unit detects decrease in the power supply voltage.

2. The position sensing device according to claim 1, wherein
    the voltage switching unit is configured to:
    set the voltage signal outputted to the electronic control unit through the wiring portion on the high-voltage side when the current detection unit detects the direction of the electric current flowing into the buffer unit and when the power-supply-voltage detection unit detects decrease in the power supply voltage; and
    set the voltage signal outputted to the electronic control unit through the wiring portion on the low-voltage side when the current detection unit detects the direction of the electric current discharged from the buffer unit and when the power-supply-voltage detection unit detects decrease in the power supply voltage.

3. The position sensing device according to claim 1, wherein the power-supply-voltage detection unit is configured to output a signal, which indicates decrease in the power supply voltage, to the voltage switching unit when the power supply voltage decreases to be less than an allowable voltage which the electronic control unit allows.

4. The position sensing device according to claim 1, wherein
    the voltage switching unit includes:
    a first switching element configured to conduct the wiring portion with a power supply wiring when the current detection unit detects the direction of the electric current flowing into the buffer unit and when the power-supply-voltage detection unit detects decrease in the power supply voltage; and
    a second switching element configured to conduct the wiring portion with a ground wiring when the current detection unit detects the direction of the electric current discharged from the buffer unit and when the power-supply-voltage detection unit detects decrease in the power supply voltage.

5. The position sensing device according to claim 1, wherein
    the movement detection unit includes:
    a first movement detection unit configured to cause an output voltage to increase as the movement of the detected object becomes large; and
    a second movement detection unit configured to cause the output voltage to decrease as the movement of the detected object becomes large.

6. A method for implementing a failsafe control on a position sensing system, the position sensing system including:
    a position sensing device configured to detect a movement of the detected object and to output a voltage signal according to the detected movement;

an electronic control unit configured to receive the voltage signal and to control the movement of the detected object according to the received voltage signal; and a pull-up resistor element or a pull-down resistor element electrically connected to the position sensing device via a wiring portion and configured to output a safe voltage signal to the electronic control unit on disconnection of the wiring portion to enable the electronic control unit to control the movement of the detected object on a safe side, the method comprising:

detecting a direction of an electric current flowing through the wiring portion;

detecting decrease in a power supply voltage applied to the position sensing device; and setting the voltage signal on a high-voltage side or a low-voltage side according to the detected direction of the electric current, on detection of decrease in the power supply voltage.

* * * * *